United States Patent
Akashi et al.

(10) Patent No.: US 11,024,042 B2
(45) Date of Patent: Jun. 1, 2021

(54) MOVING OBJECT DETECTION APPARATUS AND MOVING OBJECT DETECTION METHOD

(71) Applicants: INCORPORATED NATIONAL UNIVERSITY IWATE UNIVERSITY, Morioka (JP); SUZUKI MOTOR CORPORATION, Hamamatsu (JP)

(72) Inventors: Takuya Akashi, Morioka (JP); Uuganbayar Ganbold, Morioka (JP); Hiroyuki Tomita, Hamamatsu (JP)

(73) Assignees: INCORPORATED NATIONAL UNIVERSITY IWATE UNIVERSITY;, Morioka (JP); SUZUKI MOTOR CORPORATION, Hamamatsu (JP)

( * ) Notice: Subject to any disclaimer, the term of this patent is extended or adjusted under 35 U.S.C. 154(b) by 97 days.

(21) Appl. No.: 16/546,081

(22) Filed: Aug. 20, 2019

(65) Prior Publication Data

US 2020/0065981 A1   Feb. 27, 2020

(30) Foreign Application Priority Data

Aug. 24, 2018   (JP) .............................. JP2018-157668

(51) Int. Cl.
  *G06T 7/254*   (2017.01)
  *G06K 9/00*   (2006.01)
  *G06T 7/13*   (2017.01)

(52) U.S. Cl.
  CPC .......... *G06T 7/254* (2017.01); *G06K 9/00805* (2013.01); *G06T 7/13* (2017.01);
  (Continued)

(58) Field of Classification Search
  None
  See application file for complete search history.

(56) References Cited

U.S. PATENT DOCUMENTS

| 6,430,303 B1 * | 8/2002 | Naoi ..................... G06T 7/254 340/937 |
| 7,227,893 B1 * | 6/2007 | Srinivasa ........... G06K 9/00771 348/155 |

(Continued)

FOREIGN PATENT DOCUMENTS

| EP | WO2017077261 | * | 5/2015 |
| JP | 2010-92353 A | | 4/2010 |

(Continued)

*Primary Examiner* — Andrae S Allison
(74) *Attorney, Agent, or Firm* — Stein IP, LLC

(57) ABSTRACT

Provided are an inexpensive and safe moving object detection apparatus and moving object detection method that enable accurate detection of a moving object from an image sequence captured by a monocular camera at a high speed. A representative configuration of the moving object detection apparatus according to the present invention is provided with a horizon line detection unit that detects a horizon line in a frame image, an edge image generation unit that generates an edge image from a frame image, and a moving object detection unit that sets a detection box on a moving object, and the edge image generation unit extracts an edge image below a horizon line detected by the horizon line detection unit, and the moving object detection unit generates a foreground by combining the difference between the edge image below the horizon line and a background image of the edge image with the difference between a gray scale image and a background image of the gray scale image.

7 Claims, 21 Drawing Sheets

(52) U.S. Cl.
CPC ............... *G06T 2207/20224* (2013.01); *G06T 2207/30261* (2013.01)

(56) References Cited

U.S. PATENT DOCUMENTS

| | | | | |
|---|---|---|---|---|
| 7,668,376 B2* | 2/2010 | Lin | ......................... | G06K 9/48 |
| | | | | 382/190 |
| 7,764,808 B2* | 7/2010 | Zhu | ...................... | G06K 9/3241 |
| | | | | 382/104 |
| 10,078,902 B1* | 9/2018 | Cao | ....................... | B64D 47/08 |
| 10,089,549 B1* | 10/2018 | Cao | ................... | G06K 9/00785 |
| 10,091,507 B2* | 10/2018 | Lee | ...................... | H04N 19/124 |
| 2009/0309966 A1* | 12/2009 | Chen | ........................ | G06T 7/20 |
| | | | | 348/135 |
| 2011/0142283 A1* | 6/2011 | Huang | .................... | G06T 7/215 |
| | | | | 382/103 |
| 2016/0014406 A1* | 1/2016 | Takahashi | ............... | G06T 7/246 |
| | | | | 348/148 |
| 2016/0180179 A1* | 6/2016 | Yokota | ............... | G06K 9/00798 |
| | | | | 348/148 |

FOREIGN PATENT DOCUMENTS

| | | |
|---|---|---|
| JP | 2017-178431 A | 10/2017 |
| JP | 2019-53625 A | 4/2019 |

\* cited by examiner

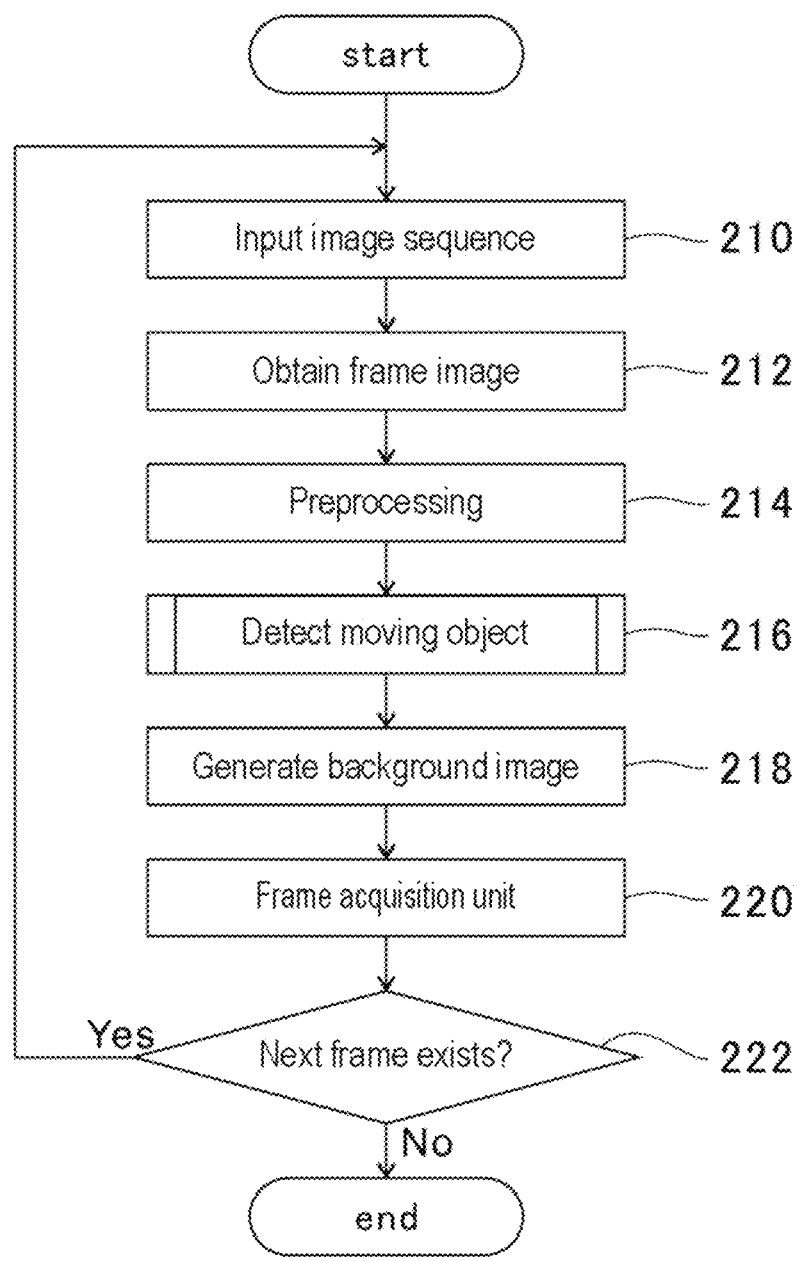

Gray scale image(G)

Background of (G)

Difference image (DG) of (G)

FIG. 6A  Input image P
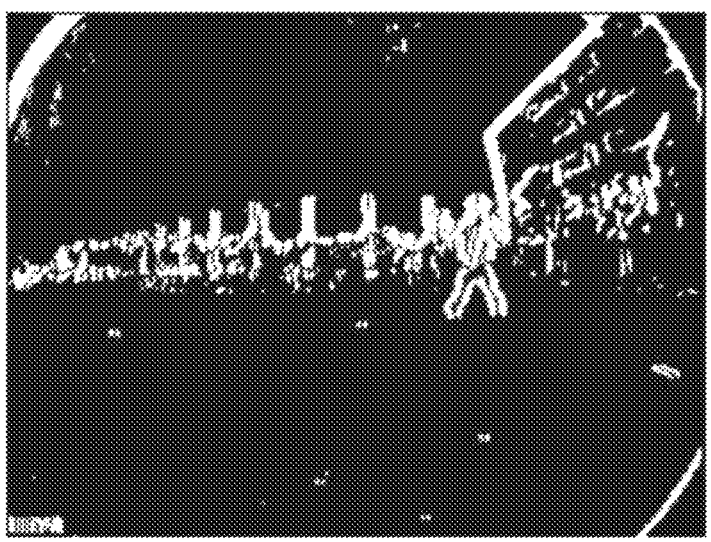
FIG. 6B  Edge image (E)
$$Edge(x,y) = \begin{cases} 1, & |P(x,y) - P(x+1,y)| \geq \text{th} \\ 0, & |P(x,y) - P(x+1,y)| < \text{th} \end{cases}$$
$P(x,y)$: Pixel values of frame
th = 3

Edge image (E)

Edge image (BE) below horizon line

Edge image (BE) below horizon line
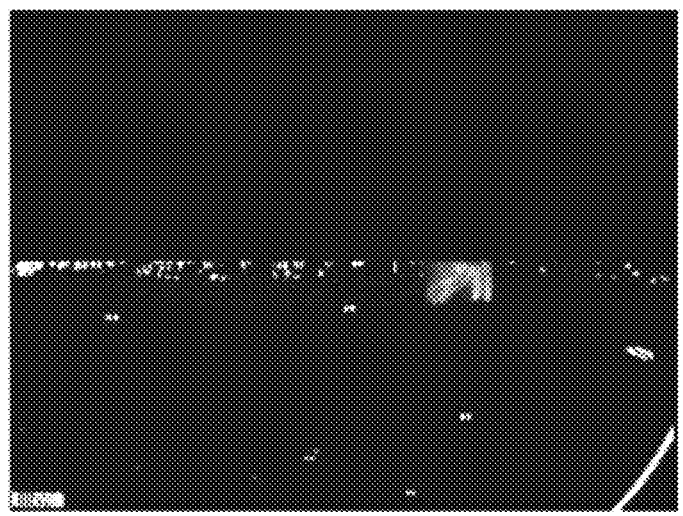
Background image of (BE)
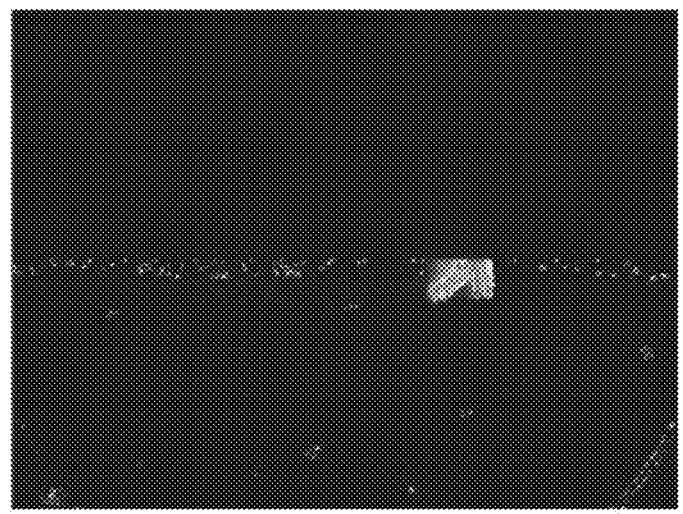
Difference image (DBE) between (BE) and background image of (BE)

Difference image (DBE) of (BE)

Binarization (BDBE) of (DBE)

Denoising (RBDBE) of (BDBE)
(Enlargement and reduction)

FIG. 11A

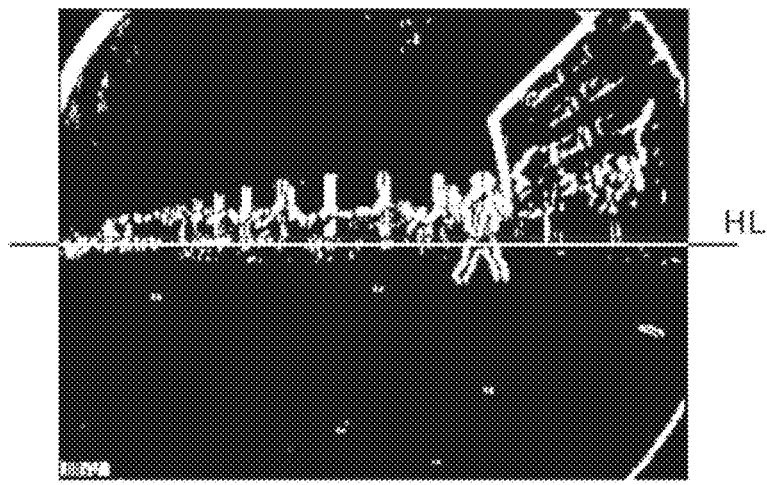

Edge image (E)

FIG. 11B

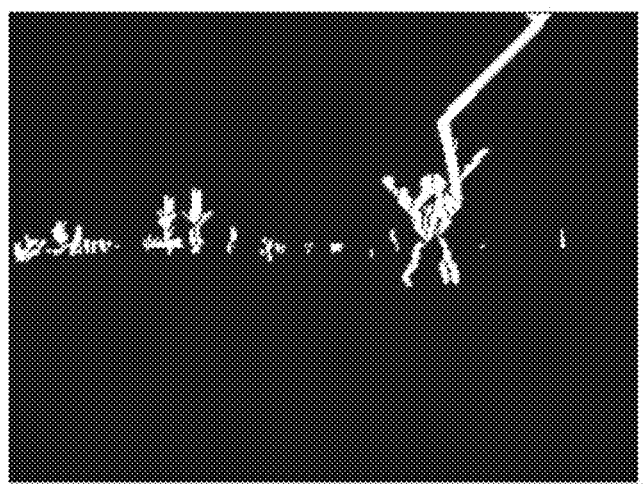

Edge image (CE) that is connected to horizon line

FIG. 11C $$y = \frac{H}{2}, \frac{H}{2}+1, \cdots, H$$

$$CE(x,y) = \begin{cases} 1, & (E(x,y) = 1 \text{ and } (CE(x,y-1) = 1 \text{ or } CE(x+1,y-1) = 1 \text{ or } CE(x-1,y-1) = 1)) \\ & \text{or } \left(y = \frac{H}{2} \text{ and } E(x,y) = 1\right) \\ 0, & \text{otherwise} \end{cases}$$

$$y = \frac{H}{2}, \frac{H}{2}-1, \cdots, 0$$

$$CE(x,y) = \begin{cases} 1, & (E(x,y) = 1 \text{ and } (CE(x,y+1) = 1 \text{ or } CE(x+1,y+1) = 1 \text{ or } CE(x-1,y+1) = 1)) \\ & \text{or } \left(y = \frac{H}{2} \text{ and } E(x,y) = 1\right) \\ 0, & \text{otherwise} \end{cases}$$

Binarization

Enlargement

Reduction

Primary candidate boxes

Detection boxes of previous frame and secondary candidate boxes

Grouping of secondary candidate boxes

Image of current frame

Primary candidate boxes

Detection boxes of previous frame

Secondary candidate boxes

Grouping and separation

Detection boxes

☐ Primary candidate boxes
☐ Secondary candidate boxes (including integrated secondary candidate boxes)

$$Correct = \begin{cases} 1 & \text{if } \frac{|a-b|}{(a+b)} \leq 0.6 \\ 0 & \text{otherwise} \end{cases}$$

$P_i(x_i, y_i)$  $i=0,\ldots,M$  $(M=2)$ $$x_i = \begin{cases} 0, & i=0 \\ i \times \frac{W}{M} - 1, & \text{others} \end{cases}$$

$y_i = B + a + bi$

H: Height of image
W: Width of image
M: Number of points
B: Height of base line

Chromosomes | $a$ | $b_0$ | $b_1$ | $\cdots$ | $b_M$ |

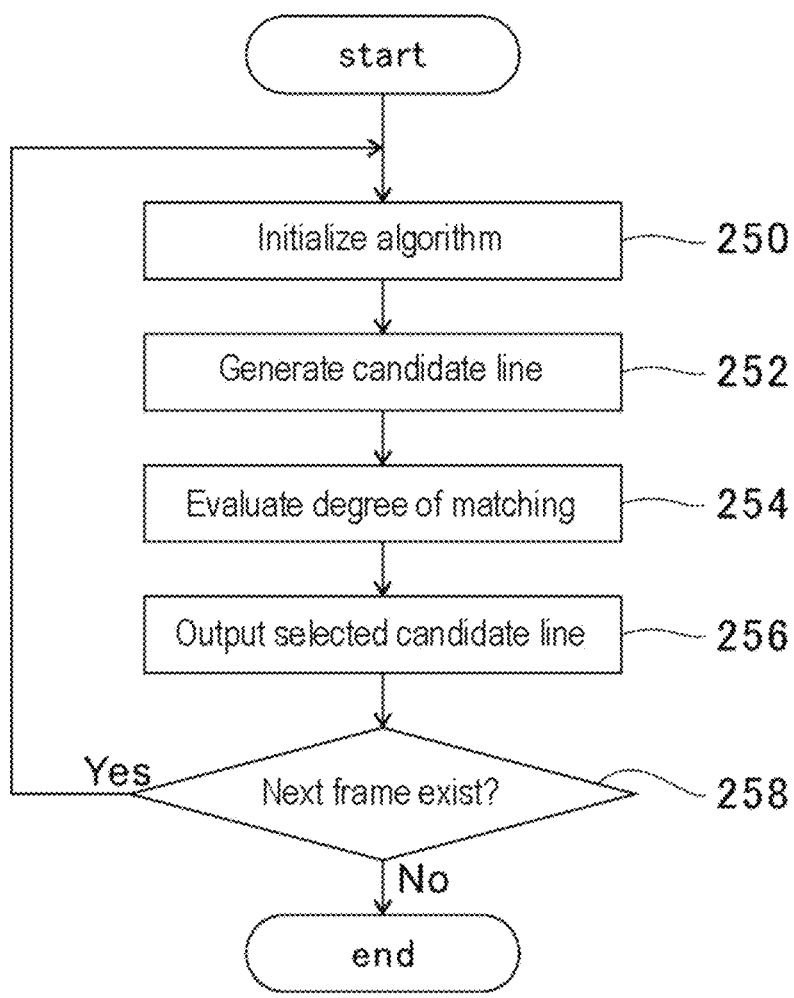

FIG. 21

Objective function F $$F = \sum_{j=0}^{L} \sum_{x=0}^{w-1} \{DiffTB(j,x) + DiffTN(j,x) + DiffBN(j,x)\}$$

$$DiffTB(j,x) = \begin{cases} 1, & |P(x,Y(x)+j) - P(x,Y(x)-j)| > threshold \\ 0, & |P(x,Y(x)+j) - P(x,Y(x)-j)| < threshold \end{cases}$$

$$DiffTN(j,x) = \begin{cases} 1, & |P(x,Y(x)-j) - P(x+1,Y(x+1)-j)| > threshold \\ 0, & |P(x,Y(x)-j) - P(x+1,Y(x+1)-j)| < threshold \end{cases}$$

$$DiffBN(j,x) = \begin{cases} 1, & |P(x,Y(x)+j) - P(x+1,Y(x+1)+j)| < threshold \\ 0, & |P(x,Y(x)+j) - P(x+1,Y(x+1)+j)| > threshold \end{cases}$$

$$Y(x) = y_i + \frac{y_{i+1}-y_i}{x_{i+1}-x_i} \times (x - x_i) \quad (x_i < x < x_{i+1})$$

$$\begin{pmatrix} threshold = 10 \\ 0 \leq j \leq L \ (L=10) \end{pmatrix}$$

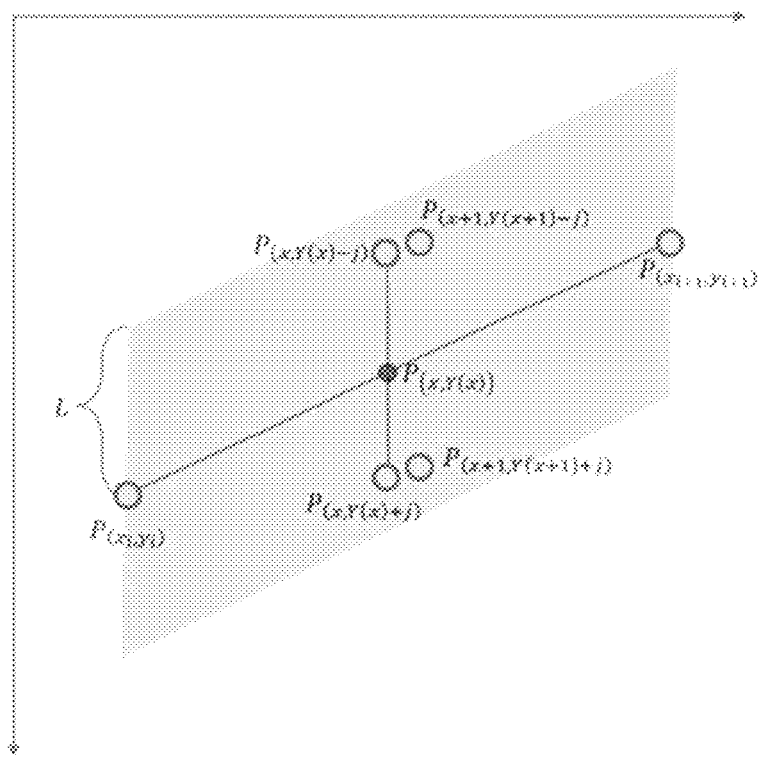

MOVING OBJECT DETECTION APPARATUS AND MOVING OBJECT DETECTION METHOD

CROSS-REFERENCE TO RELATED APPLICATION

This application is based upon and claims the benefit of priority from the prior Japanese Patent Application No. 2018-157668, filed on Aug. 24, 2018, the entire contents of which are incorporated herein by reference.

FIELD

The present invention relates to a moving object detection apparatus and a moving object detection method that enable accurate and high-speed detection of a moving object from an image sequences taken by a monocular camera.

BACKGROUND

Presently, research and development of a large number of preventive safety techniques aimed for preventing traffic accidents beforehand is advancing. In this regard, there is a need for the prevention of head-on traffic accidents between an automobile and a pedestrian, a bicycle, another automobile, or the like at intersections or the like. In systems for such needs, it is conceivable that a vehicle-mounted sensor or a vehicle-mounted camera is used to detect a moving object.

As object detection techniques that use a vehicle-mounted sensor, there are systems in which an auxiliary apparatus such as a laser range sensor is used. However, since laser apparatuses are expensive, and an intense laser cannot be irradiated on a human body, there is a problem in that it is difficult to increase its power.

When using a vehicle-mounted camera, it is conceivable to use a background subtraction method. The background subtraction method is a reliable technique that enables high speed processing, and uses changes in a dynamic scene. However, if an object has a flat texture, or the color of a portion of an object is similar to the color of the background, there are cases where only a portion of the object can be detected.

Japanese Patent Laid-open Publication No. 2010-092353 proposes an image processing apparatus that, if there are a plurality of candidates for the region to be detected (a face portion and a foot portion), specifies a size, in a captured image, to be occupied by a region to be detected, and, if another candidate is included within the size range, extracts a region obtained by coupling the candidates and the other candidate as a candidate for one new region to be detected.

However, in the technique in Japanese Patent Laid-open Publication No. 2010-092353, a size to be occupied is specified based on the positions of candidates for a region to be detected, in a captured image. In this case, it is necessary to first determine the distance of the region to be detected. In Japanese Patent Laid-open Publication No. 2010-092353, an image capturing apparatus is fixed and installed to overlook an intersection (paragraph 0038, FIG. 1). Due to this limited condition, the distance can be measured from a position in an image, but, in the case of an image of a vehicle-mounted camera, it is difficult to measure the distance.

In addition, in Japanese Patent Laid-open Publication No. 2010-092353, it is necessary to determine the type of a region to be detected (whether or not the subject is a person), and specify a size to be occupied. Such determination is very unreliable. Furthermore, in Japanese Patent Laid-open Publication No. 2010-092353, an infrared ray camera is used, and thus a portion in which a skin is exposed is detected, but the unreliability increases in terms of the fact that the area of the exposed skin differs substantially depending on the orientation of the person, closing, and hair style.

In addition, when using an inexpensive monocular camera in place of an infrared ray camera, or using a fisheye lens or a wide-angle lens in order to capture an image of a broader range, there is the possibility that noise will be higher than noise when an infrared ray camera is used.

In this regard, the applicants propose, in Japanese patent application No. 2017-178431, a moving object detection apparatus and moving object detection method that are inexpensive and safe, and enable accurate and high-speed detection of a moving object from an image sequences taken by a monocular camera. Also, the present invention aims to provide a moving object detection apparatus and a moving object detection method in which Japanese patent application No 2017-178431 is further improved, and the detection rate is improved.

SUMMARY OF THE DISCLOSURE

In order to solve the above-described issues, a representative configuration of a moving object detection apparatus according to the present invention includes an input unit for inputting an image sequence, a frame acquisition unit that continuously extracts a plurality of frame images from an image sequence, a horizon line detection unit that detects a horizon line in a frame image, an edge image generation unit that generates an edge image from a frame image, and a moving object detection unit that sets a detection box on a moving object, and the edge image generation unit extracts an edge image below the horizon line detected by the horizon line detection unit, and extracts a difference between the edge image below the horizon line and a background image of the edge image using a background subtraction method, and the moving object detection unit converts a frame image into a gray scale image and extracts a difference between the gray scale image and a background image of the gray scale image using the background subtraction method, and generates a foreground by combining the difference between the edge image below the horizon line and the background image of the edge image with the difference between the gray scale image and the background image of the gray scale image.

According to the above configuration, it is possible to accurately detect the image position of a portion in which the moving object is connected to the ground. Thus, even if the object has a flat texture or moves slowly, the entire object can be detected as a foreground, and the detection rate can be improved. Therefore, it is possible to accurately detect a moving object from an image sequences taken by a monocular camera at a high speed, and the safety can be improved inexpensively.

The moving object detection unit preferably combines the difference between the edge image below the horizon line and the background image of the edge image with the difference between the gray scale image and the background image of the gray scale image, if the difference between the edge image below the horizon line and the background image of the edge image contains only little noise.

The edge image generation unit preferably extracts an edge image that is connected to the horizon line detected by the horizon line detection unit, and the moving object detection unit preferably filters the foreground using the edge image that is connected to the horizon line. According to the above configuration, the boundary between a building and a road can be removed as noise.

When the moving object detection apparatus is moving, the moving object detection unit preferably filters the foreground using the edge image that is connected to the horizon line. When the moving object detection apparatus moves, the image's positions of a road and building change, and thus noise caused by the background subtraction method increases. Therefore, it is possible to reduce the noise in a large amount by performing the above-described filtering when the moving object detection apparatus is moving.

Another representative configuration of the moving object detection apparatus according to the present invention includes an input unit for inputting an image sequence, a frame acquisition unit that continuously extracts a plurality of frame images from an image sequence, a horizon line detection unit that detects a horizon line in a frame image, an edge image generation unit that generates an edge image from a frame image, and a moving object detection unit that sets a detection box on a moving object, and the edge image generation unit extracts an edge image that is connected to the horizon line detected by the horizon line detection unit, and the moving object detection unit converts a frame image into a gray scale image, extracts a difference between the gray scale image and a background image of the gray scale image using a background subtraction method and makes the difference a foreground, and filters the foreground using the edge image that is connected to the horizon line.

A representative configuration of a moving object detection method according to the present invention includes a step of inputting an image sequence, a step of continuously extracting a plurality of frame images from an image sequence, a step of extracting an edge image below a horizon line from a frame image, a step of extracting a difference between the edge image below the horizon line and a background image of the edge image using a background subtraction method, a step of converting a frame image into a gray scale image and extracting a difference between the gray scale image and a background image of the gray scale image using the background subtraction method, and a step of generating a foreground by combining the difference between the edge image below the horizon line and the background image of the edge image with the difference (BDG) between the gray scale image and the background image of the gray scale image.

According to the above method, it is possible to accurately detect a portion in which the image position of a moving object is connected to the ground. Thus, even if the object has a flat texture or moves slowly, the entire object can be detected as a foreground, and the detection rate can be improved. Technical ideas similar to that of the above-described moving object detection apparatus can be applied to the moving object detection method.

Another representative configuration of a moving object detection method according to the present invention includes a step of inputting an image sequence, a step of continuously extracting a plurality of frame images from an image sequence, a step of extracting an edge image that is connected to a horizon line from a frame image, a step of converting a frame image into a gray scale image, extracting a difference between the gray scale image and a background image of the gray scale image using a background subtraction method and makes the difference a foreground, and a step of filtering the foreground using the edge image that is connected to the horizon line.

According to the above method, the boundary between a building and road can be removed as noise. In particular, when the moving object detection apparatus is moving, noise can be reduced in a large amount. Technical ideas similar to that of the above-described moving object detection apparatus can be applied to the moving object detection method.

According to the present invention, it is possible to accurately detect the image position of a portion in which a moving object is connected to the ground. Thus, even if the object has a flat texture, or moves slowly, the entire object can be detected as a foreground, and the detection rate can be improved. Therefore, it is possible to provide a moving object detection apparatus and moving object detection method that are inexpensive and safe, and enable accurate and high-speed detection of a moving object from an image sequences taken by a monocular camera.

BRIEF DESCRIPTION OF THE DRAWINGS

FIG. 2 is a flowchart illustrating a moving object detection method according to this embodiment.

FIGS. 6A and 6B are image examples illustrating generation of an edge image (E).

FIGS. 8A to 8C are image examples illustrating extraction of a difference (DBE) between the edge image (BE) below the horizon line and the background.

FIGS. 11A to 11C are image examples illustrating an edge image (CE) that is connected to the horizon line.

FIG. 20 is a flowchart of the genetic algorithm.

FIG. 21 is a diagram illustrating an objective function of the genetic algorithm.

DETAILED DESCRIPTION

A preferred embodiment of the present invention will be described below in detail with reference to the attached drawings. The dimensions, materials, and other specific values indicated in the embodiment are given only for the purpose of illustration to facilitate the understanding of the present invention and not intended to limit the scope of the invention unless otherwise specified. It should be noted that in the specification and the drawings, elements with substantially identical functions or structures are denoted by identical reference signs to avoid redundant description thereof. Furthermore, elements that are not directly related to the present invention are omitted from view.

Figure 1A:
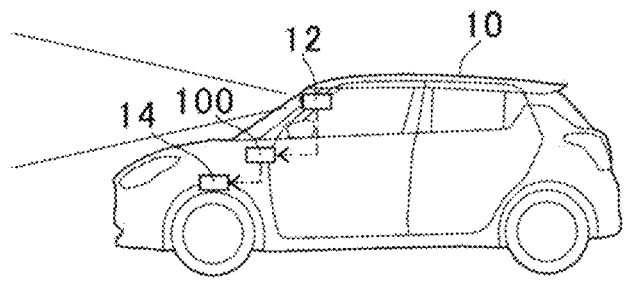
FIGS. 1A and 1B are diagrams illustrating the overall configuration of a moving object detection apparatus according to this embodiment.
Figure 1B:
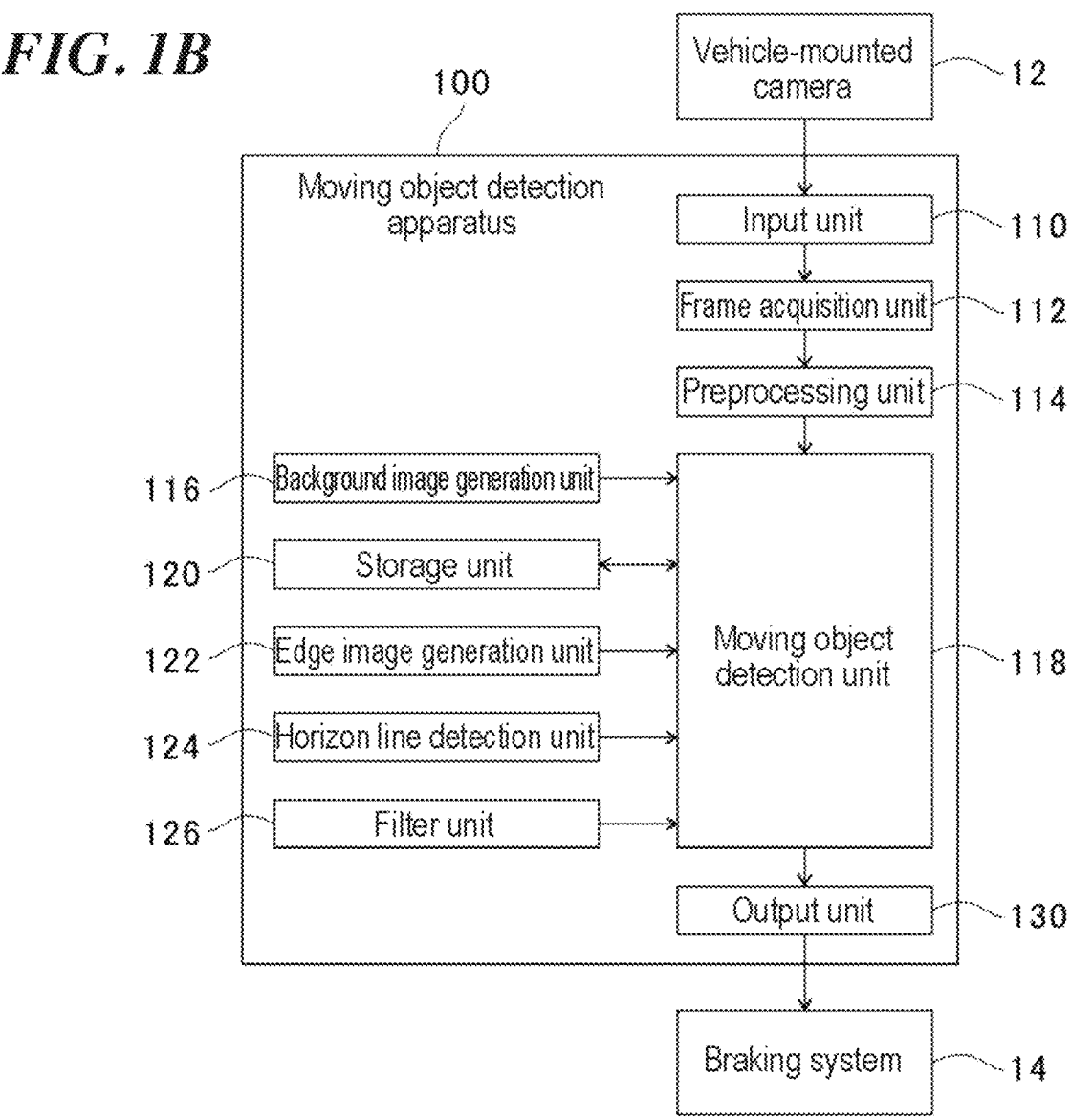

An embodiment of a moving object detection apparatus and a moving object detection method according to the present invention will be described. FIGS. 1A and 1B are diagrams illustrating the overall configuration of a moving object detection apparatus 100 according to this embodiment. FIG. 2 is a flowchart illustrating a moving object detection method according to this embodiment.

As shown in FIG. 1A, the moving object detection apparatus 100 is a vehicle-mounted system installed in an automobile 10. As a representative example, an image sequence captured by a vehicle-mounted camera 12 of the automobile 10 is input to the moving object detection apparatus 100, and a moving object is detected. Information regarding the moving object detected by the moving object detection apparatus 100 is sent to a braking system 14, a monitor (not illustrated), and the like, and is used by them.

The vehicle-mounted camera 12 is an inexpensive monocular camera, and captures an ordinary image sequence. The image sequence may be a color image or a gray scale image (monochrome image). In addition, the vehicle-mounted camera 12 may also be provided with a fisheye lens or a wide-angle lens. According to the present invention, as will be described later, a moving object can be accurately detected at a high speed, even from an image sequence captured by a monocular camera, and thus it is possible to provide a moving object detection apparatus and moving object detection method that are inexpensive and safe.

FIG. 1B shows the configuration of the moving object detection apparatus 100. The moving object detection apparatus 100 can be constructed specifically with a computer system. The configuration of the moving object detection apparatus 100 will be described below with reference to the flowchart shown in FIG. 2.

An image sequence captured by the vehicle-mounted camera 12 is input to an input unit 110 (step S210). If the image sequence is a video signal, a video encoder chip provided with a composite terminal or an HDMI terminal (registered trademark) corresponds to the input unit 110. If the image sequence is encoded digital data, a USB or an IEEE1394 interface corresponds to the input unit 110. In either case, it is sufficient that the input unit 110 can input data of an image sequence such that the data can be processed by the moving object detection apparatus 100.

A frame acquisition unit 112 continuously obtains a plurality of frame images (still images) from an image sequence that has been input (step S212). Specific processing for acquiring frames from an image sequence depends on the format of the an image sequence. For example, if the image sequence is in a format in which still images are arranged as in MotionJPEG, it is sufficient that the frames are simply extracted. Note that the frames may be extracted at fixed intervals (e.g., 0.1 seconds) irrespective of fps (frame per second) of the image sequence. The image sequence which is differentially compressed like MPEG able be extracted for each frame of a GOP (Group Of Pictures).

A preprocessing unit 114 performs preprocessing on the obtained frame images (step S214). In this embodiment, the frame image that is input is a color image, and is converted into a gray scale image as the preprocessing. Note that, as the preprocessing, denoising may also be performed, or crop processing for cutting out a region to be subjected to image processing may also be performed, as necessary.

When a frame image to be processed is set as a current frame, a moving object detection unit 118 detects a moving object from the current frame using the background subtraction method, and sets a detection box for the object (step S216). Note that, in the following description, a frame preceding the frame to be processed is referred to as "previous frame", and the subsequent frame is referred to as "next frame".

Figure 3:
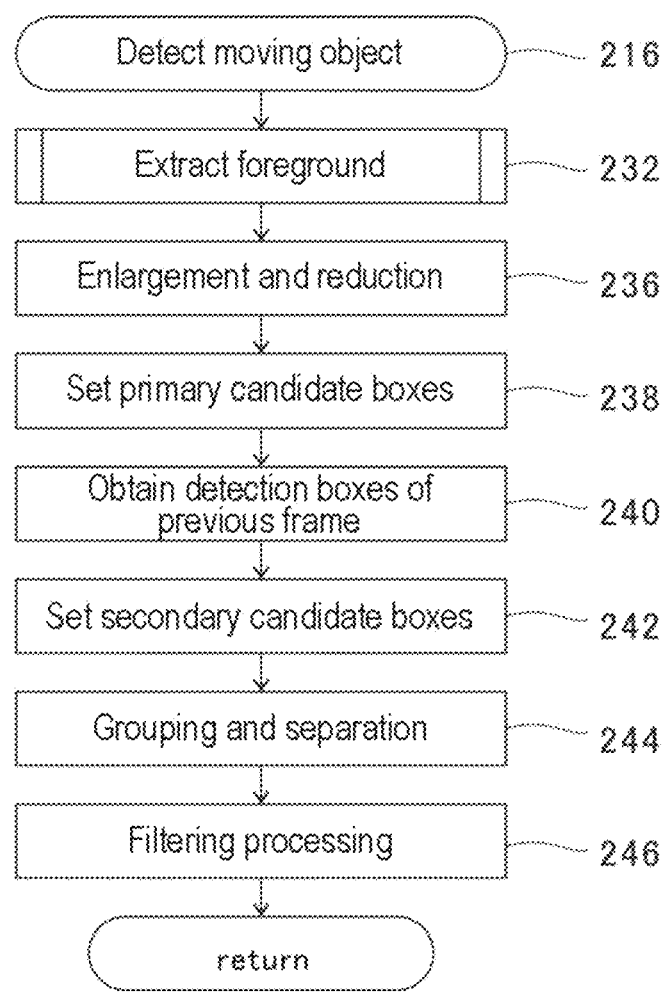
FIG. 3 is a flowchart illustrating a procedure of detection of a moving object.
Figure 4:
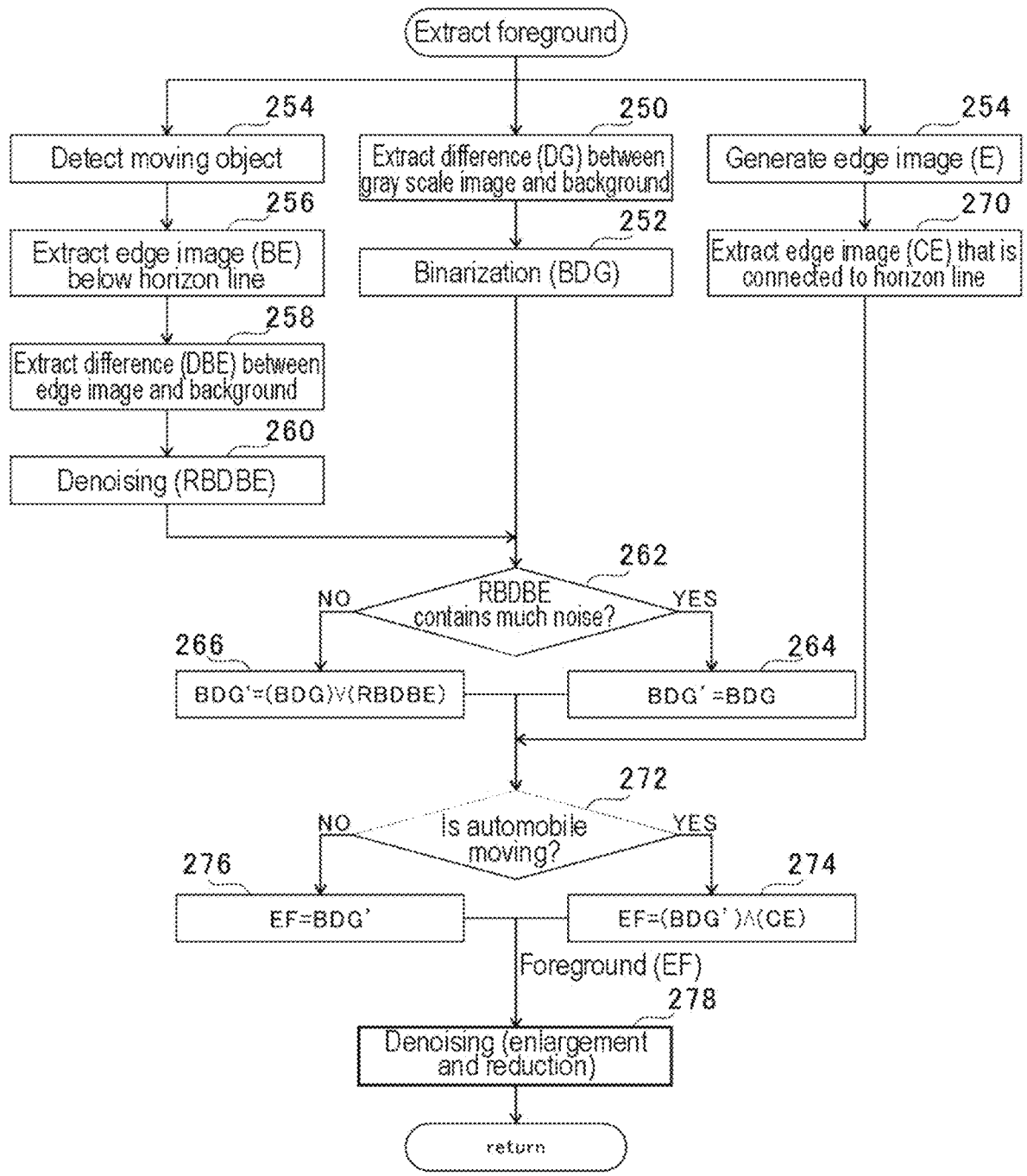
FIG. 4 is a flowchart illustrating a procedure of extraction of a foreground.

FIG. 3 is a flowchart illustrating a procedure (subroutine) of detection of a moving object, and FIG. 4 is a flowchart illustrating a procedure of extraction of a foreground (step S232).

Figure 5A:
FIGS. 5A to 5C are image examples of a background subtraction method.
Figure 5B:
Figure 5C:
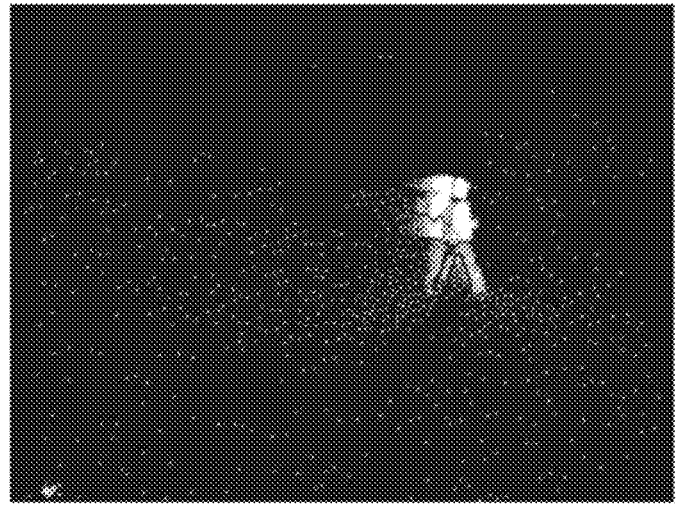

As shown in FIG. 4, the moving object detection unit 118 extracts a difference (DG) between a gray scale image, which is the current frame, and a background image of the gray scale image (step S250). FIGS. 5A to 5C are image examples of the background subtraction method. In the image of the current frame shown in FIG. 5A, there is a horizon line at the center of the image, and there are a pedestrian and a building on the right side. In addition, there are shrubberies and a fence along the horizon line. In this image, the pedestrian is a moving object.

The background image shown in FIG. 5B is obtained from a background image generation unit 116 to be described later. Also, in the background image, a moving object is shown, but the position thereof changes gradually. If the background subtraction method is applied to these images (luminance subtraction is performed), pixels that indicate the difference are extracted, as in the difference image shown in FIG. 5C. These pixels that indicate the difference constitute the foreground.

The foreground extracted using the background subtraction method has low luminance and is in a finely fragmented state. In view of this, smoothing (blurring processing) using a Gaussian filter or the like is performed so as to couple proximate foregrounds, and after that, a binarized image (BDG) is generated for clarification (step S252).

The moving object detection unit 118 performs processing of an edge image (E) in parallel with processing of the gray scale image. FIGS. 6A and 6B are image examples illustrating the generation of an edge image (E). An edge image generation unit 122 generates the edge image (E) shown in FIG. 6B (step S254) by setting 1 if the pixel value of the difference to one of the adjacent pixels in the frame image shown in FIG. 6A is larger than or equal to a threshold value, and setting 0 if the pixel value is smaller than the threshold value. The generation of an edge image is also called "contour extraction processing".

Next, the edge image generation unit 122 extracts an edge image (BE) below the horizon line (step S256). The horizon line is detected from the image of the current frame by a horizon line detection unit 124 using a genetic algorithm. The processing for detecting the horizon line will be described later.

Figure 7A:
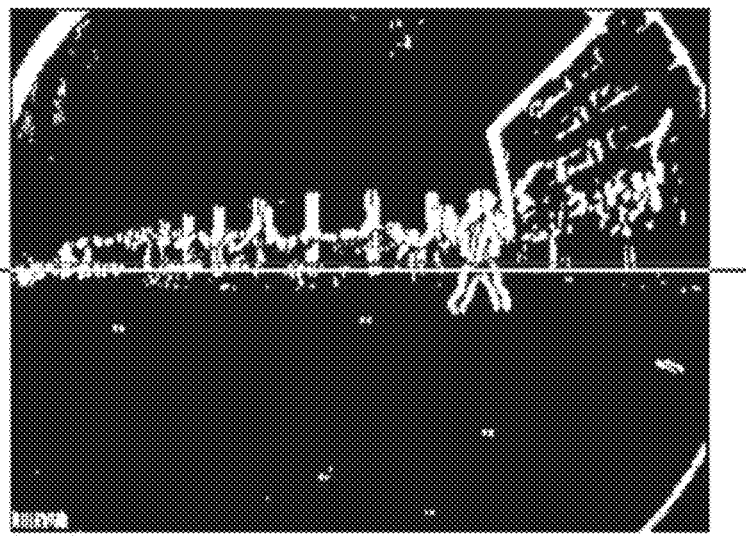
FIGS. 7A and 7B are image examples illustrating extraction of an edge image (BE) below the horizon line.
Figure 7B:
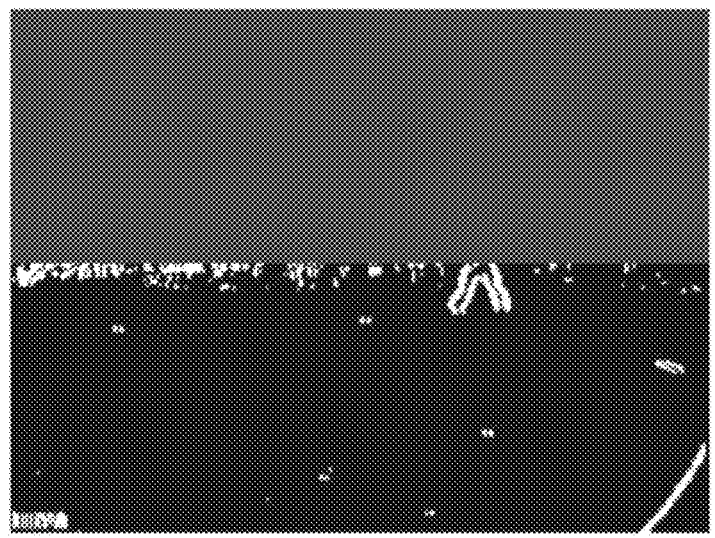

FIGS. 7A and 7B are image examples illustrating extraction of the edge image (BE) below the horizon line. A horizon line HL detected by the horizon line detection unit 124 is drawn in the edge image (E) shown in FIG. 7A. The edge image (BE) below the horizon line HL is then extracted (step S258) as shown in FIG. 7B.

FIGS. 8A to 8C are image examples illustrating extraction of the difference (DBE) between the edge image (BE) below the horizon line and the background image of the edge image (BE). The background image generation unit 116 generates the background image shown in FIG. 8B, using the edge image (BE) below the horizon line shown in FIG. 8A. The edge image generation unit 122 then obtains the difference (DBE) between the edge image (BE) and the background image of the edge image (BE) as shown in FIG. 8C.

Figure 9A:
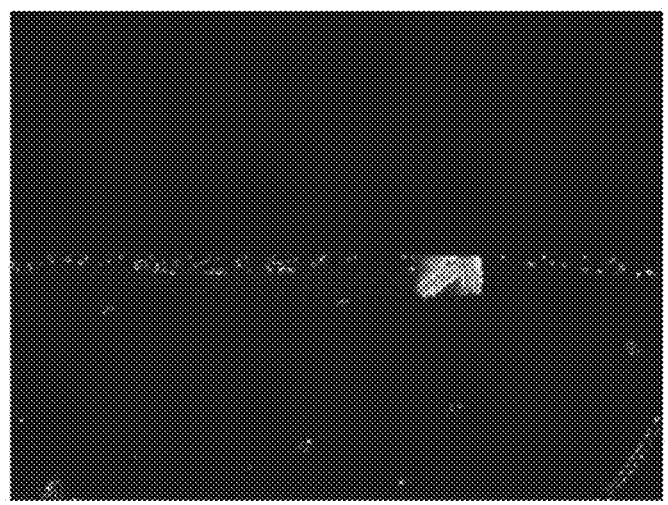
FIGS. 9A to 9C are image examples illustrating denoising of an edge image.
Figure 9B:
Figure 9C:
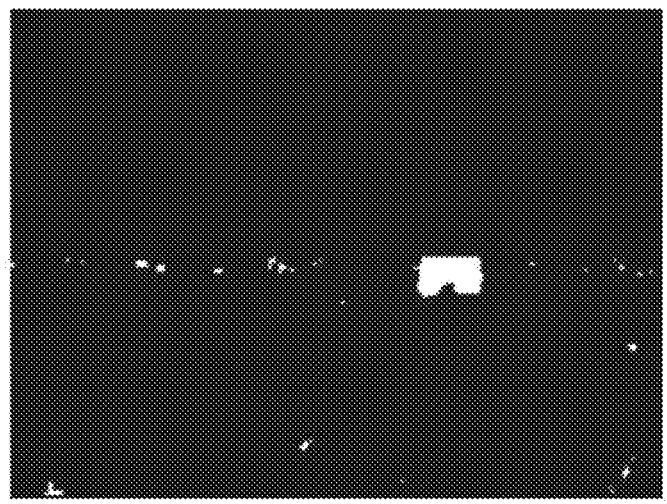

The edge image is rough, and thus the difference (DBE) between the edge image (BE) and the background image of the edge image (BE) also contains much noise. FIGS. 9A to 9C are image examples illustrating denoising of the edge image. The edge image generation unit 122 performs binarization processing on the difference (DBE) between the edge image (BE) and the background image of the edge image (BE) shown in FIG. 9A, and generates a binarized image (BDBE) as shown in FIG. 9B. Dilation and erosion are further performed, and a denoised difference (RBDBE) between the edge image (BE) below the horizon line (HL) and the background image of the edge image (BE) as shown in FIG. 9C is obtained (step S260). The dilation and erosion will be described later with reference to FIGS. 13A to 13C.

The moving object detection unit 118 combines, with the binarized image (BDG), which is a gray scale image, the denoised difference (RBDBE) between the edge image (BE) below the horizon line (HL) and the background image of the edge image (BE). It should be note that, also denoising was performed, there is the possibility that the difference (RBDBE) between the edge image (BE) and the background image of the edge image (BE) still contains much noise.

Figure 10:
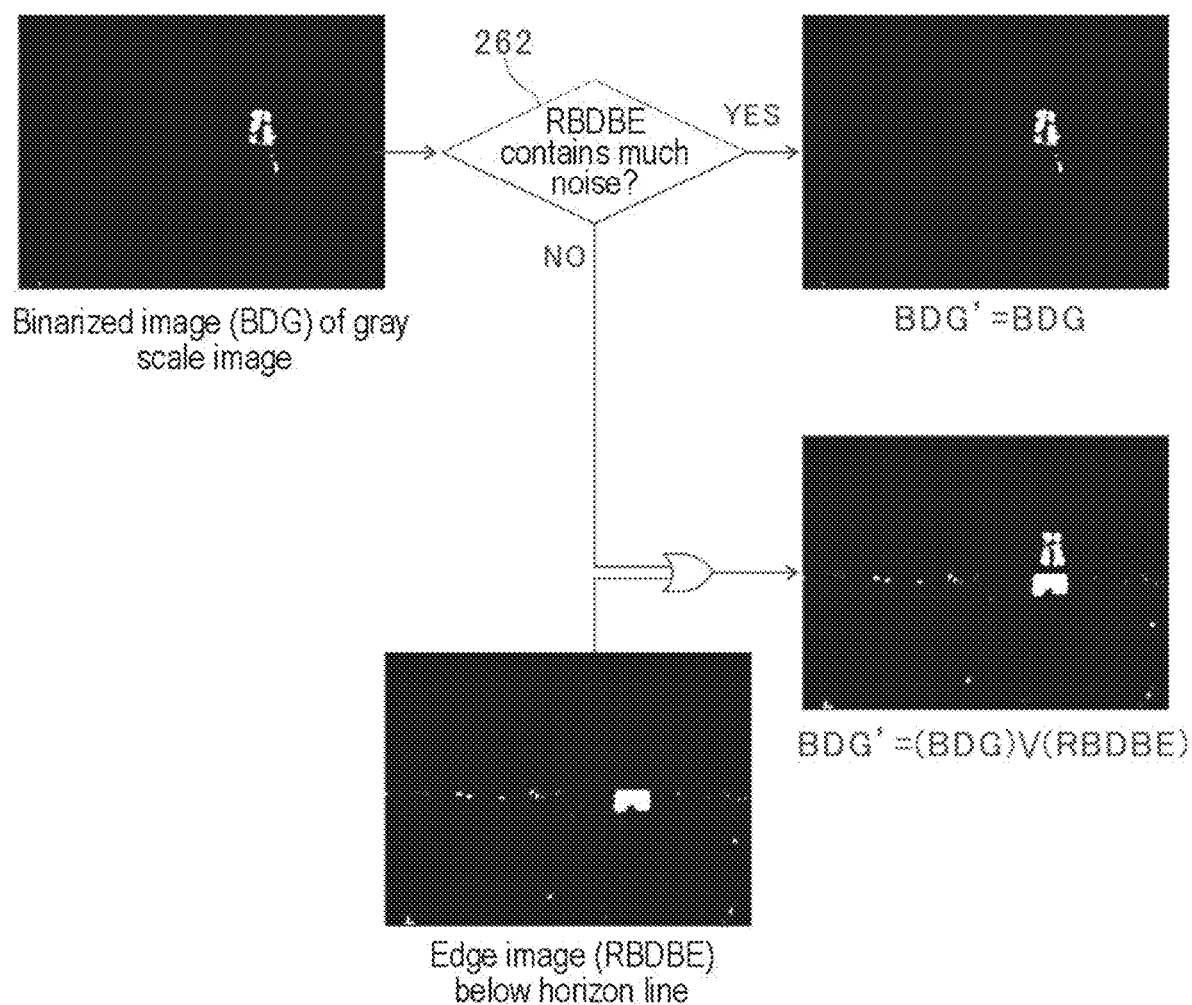
FIG. 10 is an image example illustrating combination of a difference (RBDBE) between the edge image (BE) and a background image of the edge image (BE).

In view of this, the moving object detection unit 118 determines the degree of noise of the denoised difference (RBDBE) between the edge image (BE) below the horizon line (HL) and the background image of the edge image (BE) (step S262). FIG. 10 is an image example illustrating the combination of the difference (RBDBE) between the edge image (BE) and the background image of the edge image (BE). As shown in FIG. 10, if the difference (RBDBE) between the edge image (BE) and the background image of the edge image (BE) contains much noise (YES in step S262), the difference (RBDBE) is not combined, and the binarized image (BDG), which is a gray scale image, is used as it is as a binarized image (BDG') (step S264). If the difference (RBDBE) between the edge image (BE) and the background image of the edge image (BE) contains only little noise (NO in step S262), an image obtained by combining, with the binarized image (BDG), which is a gray scale image, the difference (RBDBE) between the edge image (BE) and the background image of the edge image (BE) is used as the binarized image (BDG') (step S266).

According to the above configuration, it is possible to accurately detect the image position of a portion in which a moving object is connected to the ground. Thus, if the object has a flat texture, or moves slowly, the entire object can be detected as a foreground, and the detection rate can be improved. Therefore, it is possible to accurately detect a moving object from an image sequence captured by a monocular camera at a high speed, and to improve the safety inexpensively.

The binarized image (BDG') generated as described above may also be set as a foreground (EF) in this state. However, in this embodiment, in order to further improve the detection rate, the foreground is filtered using the edge image that is connected to the horizon line.

In the above description, when generating the edge image (E) (step S254), the moving object detection unit 118 extracts the edge image (BE) below the horizon line (step S256). In parallel with this, an edge image (CE) that is connected to the horizon line is extracted from the edge image (E) (step S270).

FIGS. 11A to 11C are image examples illustrating the edge image (CE) that is connected to the horizon line. FIG. 11A shows same the edge image (E) as in FIGS. 6B and 7A. In this edge image (E), if only those pixels that are connected to the horizon line detected by the horizon line detection unit 124 are extracted, it is possible to obtain an edge image (CE) that is connected to the horizon line as shown in FIG. 11B. FIG. 11C shows an example of a conditional expression for extracting the pixels.

The moving object detection unit 118 then determines whether or not the automobile 10 is moving, in other words, whether or not the moving object detection apparatus 100 is moving (step S272). If the moving object detection apparatus moves, image positions of the road and the building change, and thus the positions of the contours of them deviate, and edges are detected by the background subtraction method. The boundary between the road and the building is not a moving object, and thus these edges are noise.

Figure 12:
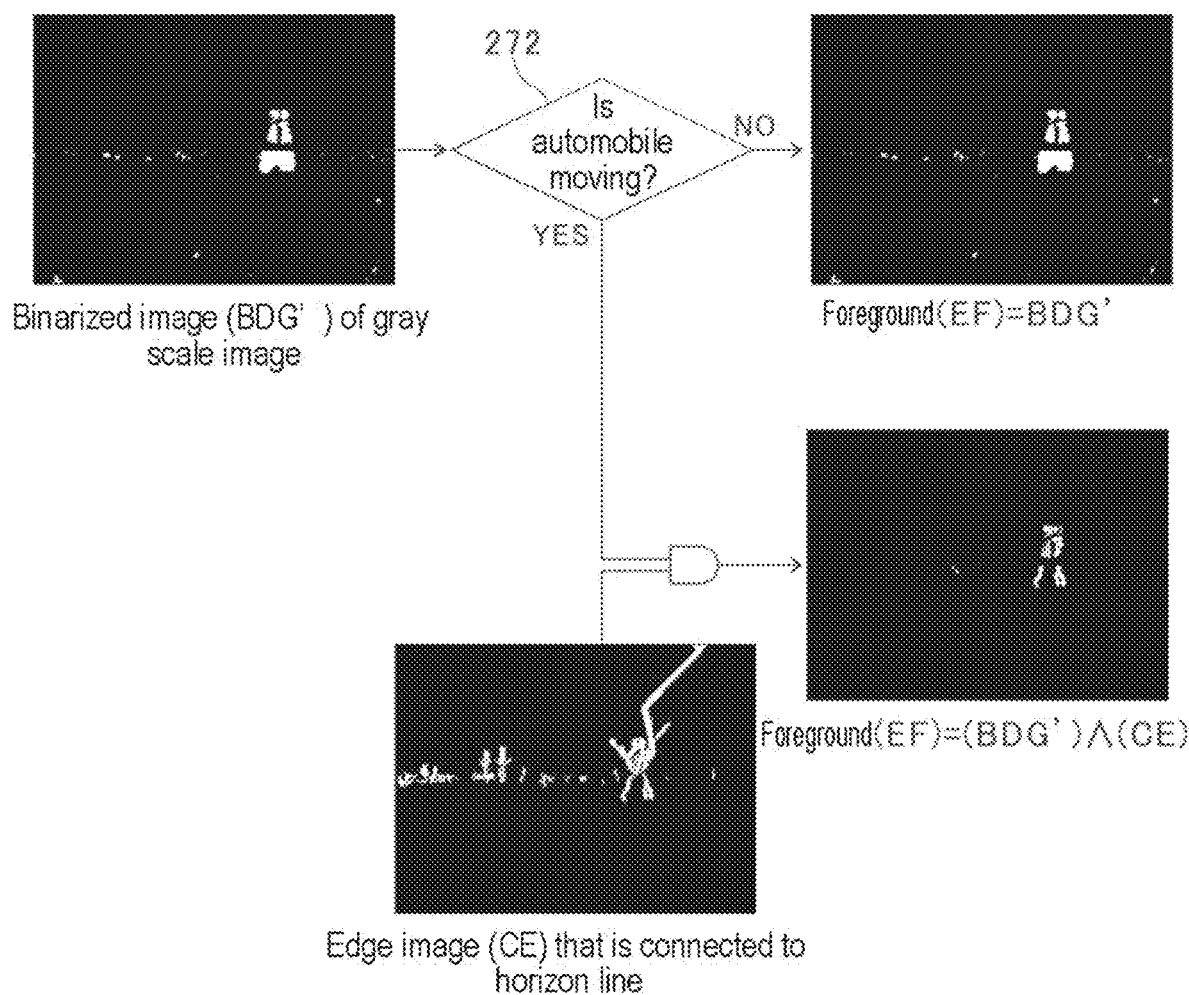
FIG. 12 is an image example illustrating filtering of a binarized image (BDG').

FIG. 12 is an image example illustrating filtering of the binarized image (BDG'). As shown in FIG. 12, if the automobile 10 is not moving (NO in step S272), the binarized image (BDG') is set as the foreground (EF) as it is (step S276). If the automobile 10 is moving (YES in step S272), filtering is performed by performing an AND operation on the binarized image (BDG') and the edge image (CE) that is connected to the horizon line (only common pixels are left) (step S274).

According to the above configuration, the edge of the boundary between the road and building that appears when the moving object detection apparatus is moving can be removed as noise. Therefore, it is possible to reduce noise by a large amount, and, furthermore, it is possible to further improve the detection rate of a moving object.

Figure 13A:
FIGS. 13A to 13C are image examples illustrating dilation and erosion of foregrounds.
Figure 13B:
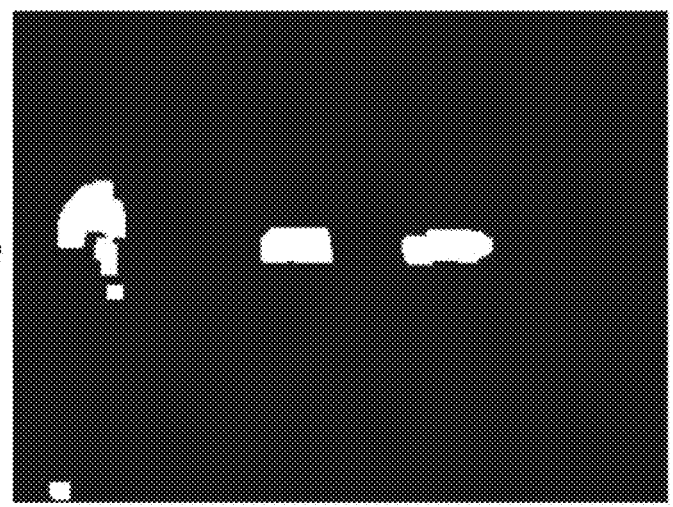
Figure 13C:

Next, the moving object detection unit 118 performs denoising on the foreground (EF) (step S278). FIGS. 13A to 13C are image examples illustrating dilation and erosion of foregrounds. In FIGS. 13A to 13C, there are still voids and fine fragmentation, and thus the foregrounds are enlarged as shown in FIG. 13B, and, subsequently, the foregrounds are reduced as shown in FIG. 13C (step S236).

Dilation is processing in which, when background pixels are defined as being black, foreground pixels are defined as being white, and a filter diameter is defined as, for example, 5×5, the pixels within the filter diameter centered on all of the white pixels are changed to white. Erosion is opposite to dilation, and is processing for changing the pixels within the filter diameter centered on all of the black pixels to black. When dilation and erosion are performed, outer edge contours return to their original positions, but voids and fragmentation (discontinuities) filled through dilation remain to be filled even if erosion is performed, and thus smoothing with proximate pixels can be performed.

Here, as described at the beginning, in the background subtraction method, if an object has a flat texture, or the color of a portion of an object is similar to the color of the background, there is no difference in luminance between the background image and the image of the current frame, and thus there are cases where only a portion of the object can be detected. In this case, foregrounds are separated from each other, and thus, foregrounds cannot be coupled to each other only through the above-described smoothing, dilation, and erosion. In view of this, in the present invention, candidate boxes are integrated and separated, as will be described later.

Grouping is processing in what should actually be just one moving object is determined to have been extracted as a plurality of detection boxes due to erroneous detection, and the detection boxes are converted into one detection box. Separation is processing for determining proximate detection boxes to be a plurality of proximate moving objects, and using them as independent detection boxes.

Figure 14A:
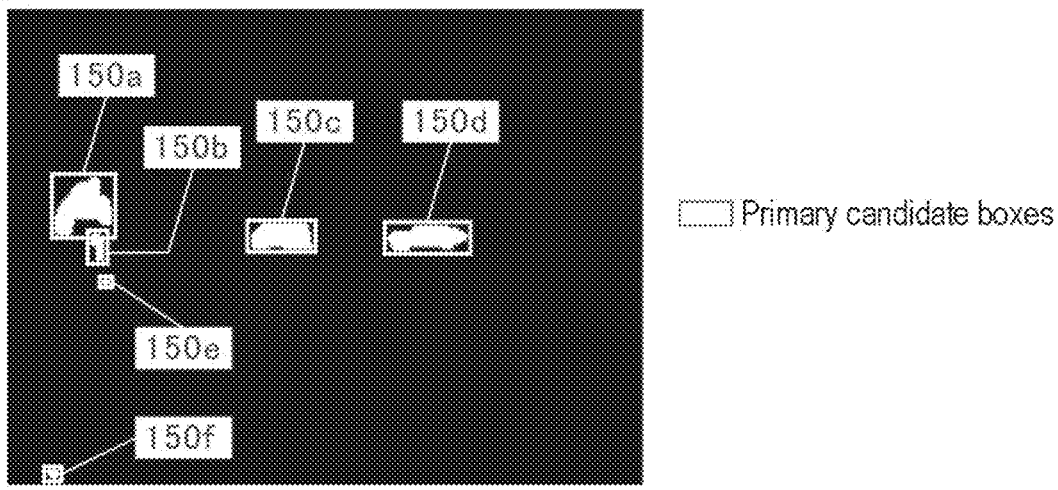
FIGS. 14A to 14C are image examples illustrating setting of detection boxes.
Figure 14B:
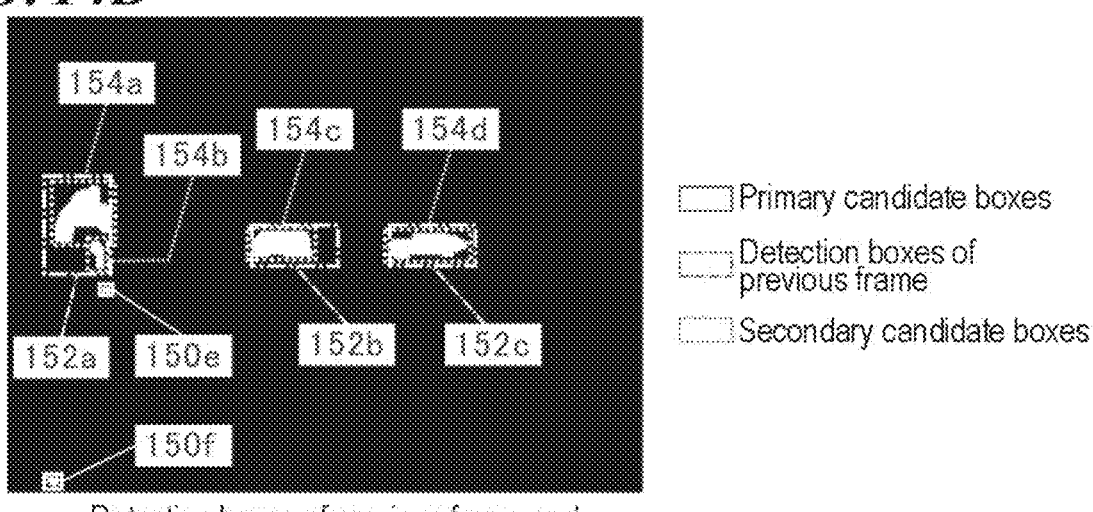
Figure 14C:
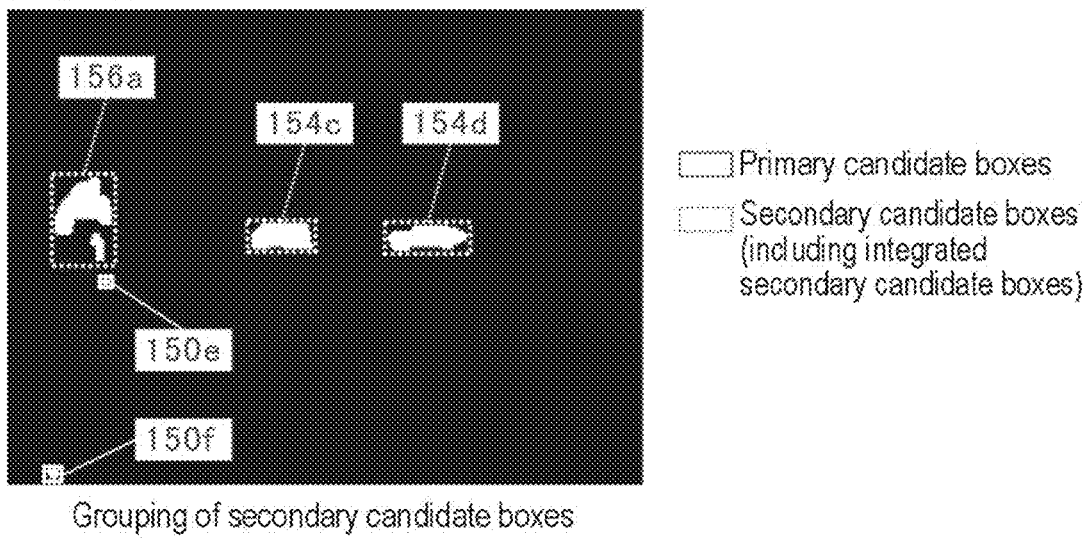

FIGS. 14A to 14C are image examples illustrating the setting of detection boxes. The moving object detection unit 118 detects the contours of extracted foregrounds, and defines frames that enclose the foregrounds as primary candidate boxes 150a to 150f as shown in FIG. 14A (step S238). The moving object detection unit 118 then obtains detection boxes of the previous frame from a storage unit 120 (step S240). Note that if there is no detection box of the previous frame yet in the current frame, this grouping and separation processing (steps S240¬ to S244) is skipped.

The moving object detection unit 118 then sets, from among the primary candidate boxes 150a to 150f shown in FIG. 14A, primary candidate boxes that overlap detection boxes 152a to 152c of the previous frame by a predetermined overlap-rate or larger (e.g. 50% or larger), as secondary candidate boxes 154a to 154d as shown in FIG. 14B (step S242). In FIG. 14B, detection boxes 152 of the previous frame are indicated by dashed-dotted lines, and secondary candidate boxes 154 are indicated by broken lines. The primary candidate boxes 150e and 150f that did not become secondary candidate boxes, from among the primary candidate boxes 150a to 150f, are regarded as detection boxes as is (a "detection box" is not a candidate).

The moving object detection unit 118 groups secondary candidate boxes that overlap detection boxes 152 of the previous frame, from among the secondary candidate boxes 154. The secondary candidate boxes 154a and 154b overlap the detection box 152a of the previous frame positioned on the left in FIG. 14B, and thus are grouped. Subsequently, the grouped secondary candidate boxes 154a and 154b, which overlap in the y-axis direction by a predetermined overlap-rate or larger (e.g., 30% is larger), are defined as an integrated detection box 156a as shown in FIG. 14C. If the grouped secondary candidate boxes 154a and 154b do not overlap in the y-axis direction by the predetermined overlap-rate or larger, they are defined as separated (independent) detection boxes (step S244). Note that "overlapping in the y-axis direction by a predetermined overlap-rate" is synonymous with the ranges of the coordinates of boxes in the x-axis direction overlapping by a predetermined overlap-rate.

To organize the above, the three following types of boxes are regarded as "detection boxes".

primary candidate boxes that did not become secondary candidate boxes (150e and 150f)

secondary candidate boxes that were integrated (156a)

secondary candidate boxes that remain separated instead of being integrated (154c and 154d)

Note that if there are a large number of grouped secondary candidate boxes, there are cases where a plurality of integrated detection boxes are set. For example, if one group includes four secondary candidate boxes, there are cases where two detection boxes each including two integrated secondary candidate boxes are set.

Figure 15A:
FIGS. 15A to 15F are other image examples illustrating grouping and separation.
Figure 15B:
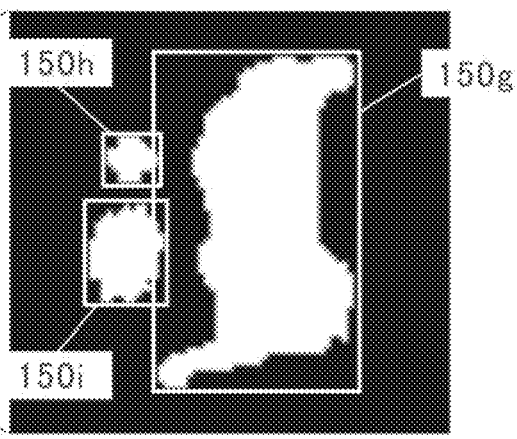
Figure 15C:
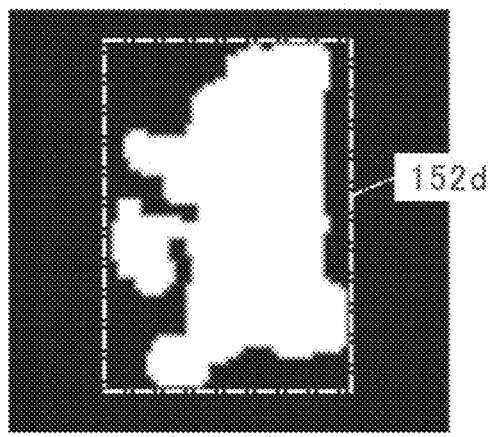

FIGS. 15A to 15F are other image examples illustrating grouping and separation, and are processing examples when two pedestrians that appeared to overlap are separating from each other. FIG. 15A shows the image of the current frame. The two pedestrians are walking on a road. FIG. 15B shows foregrounds extracted from the current frame, and corresponds to a center portion of the current frame. The foreground of the person on the right is represented as one primary candidate box 150g, while the foreground of the person on the left is represented as two primary candidate boxes 150h and 150i that are vertically separated. The number of blocks of the foregrounds of the two pedestrian is three in total. FIG. 15C shows a foreground extracted from the previous frame and a detection box. The two pedestrians still appeared to overlap in the previous frame, and thus the two persons are represented as one large detection box 152d.

Figure 15D:
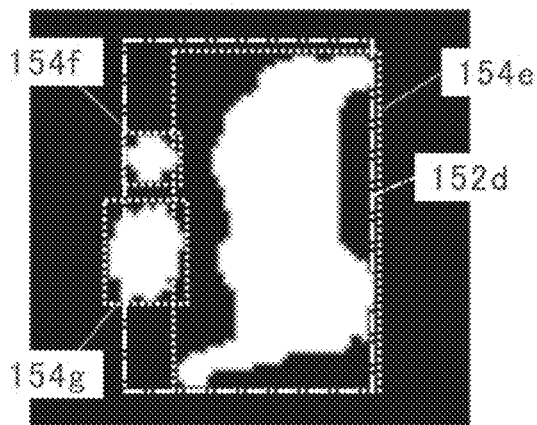

Subsequently, as shown in FIG. 15D, the moving object detection unit 118 superimposes the detection box 152d of the previous frame on the primary candidate boxes 150, and sets primary candidate boxes 150 that overlap the detection box 152d by a predetermined overlap-rate or larger, as secondary candidate boxes. In this example, the three primary candidate boxes 150g to 150i all become three secondary candidate boxes 154e to 154g. In addition, the three secondary candidate boxes 154e to 154g overlap the detection box 152d of the same previous frame, and thus these are grouped.

Figure 15E:
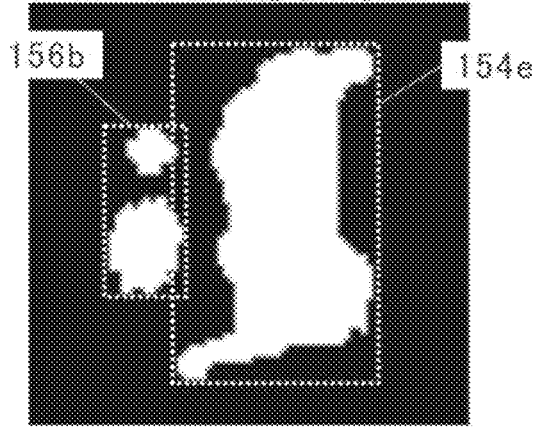
Figure 15F:
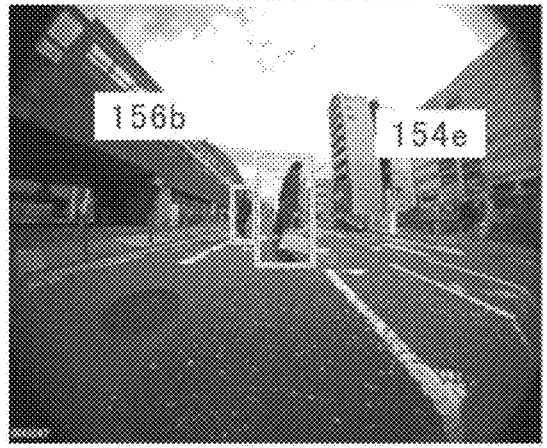

In FIG. 15D, the secondary candidate boxes 154f and 154g overlap each other in the y-axis direction by a predetermined overlap-rate or larger, and are thus defined as an integrated detection box 156b as shown in FIG. 15E. The secondary candidate box 154e does not overlap the integrated detection box 156b in the y-axis direction by the predetermined overlap-rate or larger, and thus remains separated instead of being integrated. As a result, as shown in FIG. 15F, respective detection boxes (the secondary candidate box 154e and the integrated detection box 156b) are set for the two pedestrians. Note that, when determining the degree of overlapping, the size (length) in the x-axis direction of a portion in which two candidate boxes overlap may be compared with the size in the x-axis direction of one of the two candidate boxes that is smaller in this direction.

In this manner, it is possible to appropriately integrate the three foregrounds, and set detection boxes on the two moving objects. Also, at the same time, one detection box in the previous frame can be separated into two detection boxes in the current frame.

Figure 16A:
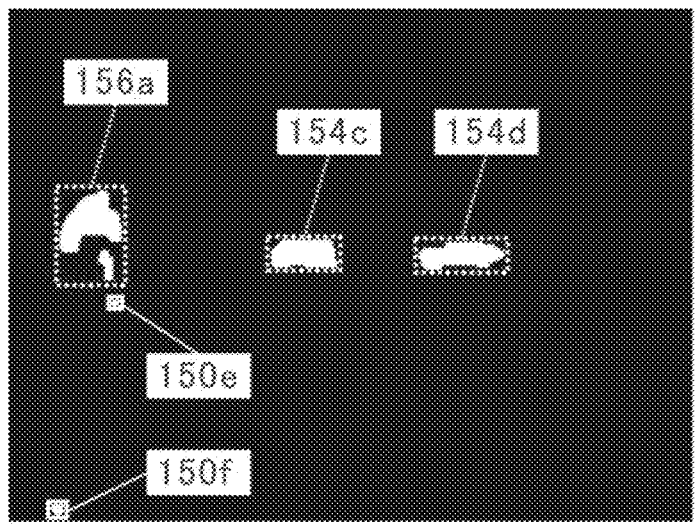
FIGS. 16A and 16B are image examples illustrating filtering processing of detection boxes.
Figure 16B:
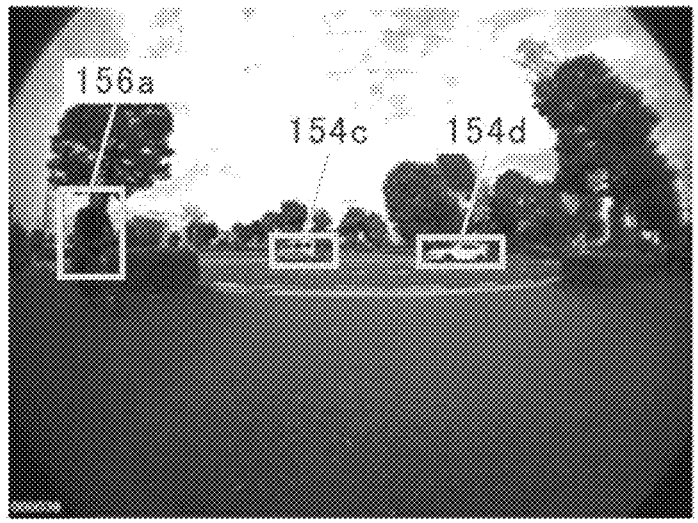

FIGS. 16A and 16B are image examples illustrating filtering processing of detection boxes (step S246). FIG. 16A shows the detection boxes after grouping and separation have ended (see FIG. 14C). In FIG. 16A, the person riding a bicycle on the left in the image is defined as the integrated detection box 156a, and the two automobiles at the center of the image are detected as the secondary candidate boxes 154c and 154d. Also, although the primary candidate boxes 150e and 150f remain as detection boxes, they are extremely small, and thus can be considered as noise.

In view of this, in this embodiment, a filter unit 126 removes detection boxes that do not satisfy a predetermined size or aspect ratio, from one or more detection boxes detected in the current frame (ASF: area size filtering). Accordingly, extremely small detection boxes and extremely long and thin detection boxes are removed.

In the example in FIG. 16B, extremely small detection boxes (the primary candidate boxes 150e and 150f) are removed through filtering processing, and the integrated detection box 156a and the secondary candidate boxes 154c and 154d remain. Note that, in FIG. 16B, these final detection boxes are superimposed on the gray scale image of the current frame, not a binary image, and are shown.

A movement of the camera and using a wide-angle view camera (like a fisheye camera) cause an increase in noise. In view of this, it is possible to remove noise by performing the above-described filtering processing, and improve the accuracy of detection of a moving object.

The moving object detection unit 118 registers the final detection boxes on which the filter unit 126 performed filtering processing, to the storage unit 120 (step S218). The detection boxes are stored in association with frame numbers, and it is possible to read out the registered detection boxes for an image of any frame. In particular, as the detection boxes in the previous frame were used for image processing of the current frame in the above description, detection boxes of the current frame will be used for image processing of the next frame. In addition, detection boxes that have been set by the moving object detection apparatus 100 are sent to the braking system 14, a monitor (not illustrated), and the like by an output unit 130.

The background image generation unit 116 generates (updates) a background image for processing the image of the next frame (step S220). No foreground is extracted from the first frame image from among a plurality of frame images obtained by the frame acquisition unit 112, and the first frame image is used as a background image only. When foregrounds are extracted from the second frame image, the first frame image is used as a background image. When foregrounds are extracted from the third frame image onward, a background image generated (updated) by the background image generation unit 116 is used.

Figure 17:
FIG. 17 is an image example illustrating generation of a background image.

FIG. 17 is an image example illustrating generation of a background image. The background image generation unit 116 combines a background image and the image of the current frame to update the background image, and sets the updated background image as a background image when processing the next frame. As a specific example, as shown in FIG. 17, an image in which the luminance of the current frame is decreased to 25% and an image in which the luminance of a background image is decreased to 75% are combined, and a background image is generated. By sequentially generating (updating) a background image in this manner, a background image can be generated as appropriate even in cases of an image sequence captured while moving the camera, and an image sequence that is never in a state where there is no moving object.

In addition, in the background subtraction method, the computing cost for an update of a background model that is based on learning is high, and thus it has been regarded to be difficult to apply such an update of a background model to high-speed image processing. However, the computation amount for combining a past background image and the image of current frame as in this embodiment is small, and thus it is possible to increase the efficiency regarding the computing cost of the entire system.

When generation of a background image is complete, whether or not there is a next frame image is determined (step S222). If there is a next frame image, the above-described series of processing is repeated. If there is no next frame, the procedure ends.

As described above, according to the moving object detection apparatus and moving object detection method according to this embodiment, grouping and separation are performed on candidate boxes in the current frame, within the range of candidate boxes that overlap detection boxes of the previous frame. It is not necessary to determine the type or distance of a moving object, and it is also possible to perform grouping and separation of candidate boxes even if there is much noise.

Accordingly, even in case of an image of an inexpensive monocular camera and an image captured by a camera such as a vehicle-mounted camera while it is moving, it is possible to set detection boxes appropriately corresponding to moving objects. In addition, the background subtraction method enables high-speed processing, and, also, grouping and separation processing of candidate boxes and filtering processing that have been described above can be performed at a high speed. Therefore, approaching moving objects can be accurately detected at a high speed, and the safety can be improved.

In particular, the algorithm for grouping and separation is simple, and thus, compared with a conventional mere background subtraction method, an increase in the computation amount is small despite the detection rate of a moving object being increased by a large amount. This technique is highly practicable, and its technical advantage is sufficiently high compared with conventional techniques. In addition, in the present invention, only one monocular camera is used, and thus the present invention is very advantageous in terms of the cost compared with conventional techniques in which a plurality of cameras, a laser radar, an infrared camera, and the like are used.

The present invention can be applied to a vehicle-mounted safe driving system for preventing head-on traffic accidents and an automatic travel system of a moving apparatus such as a robot. In addition, there is no limitation to systems installed in automobiles, robots, and the like, and the present invention can also be applied to monitoring systems that are installed in a fixed manner, and use a wide-angle security camera.

In the above embodiment, description has been given in which the filter unit 126 removes detection boxes that do not satisfy a predetermined size or aspect ratio (ASF). In this regard, a configuration may also be adopted in which, in place of or in addition to ASF, the horizon line detection unit 124 detects the horizon line, and one or more detection boxes that do not overlap the horizon line by a predetermined ratio, from among one or more detection boxes detected in the current frame, are removed (HLF: horizontal line filtering).

Figure 18A:
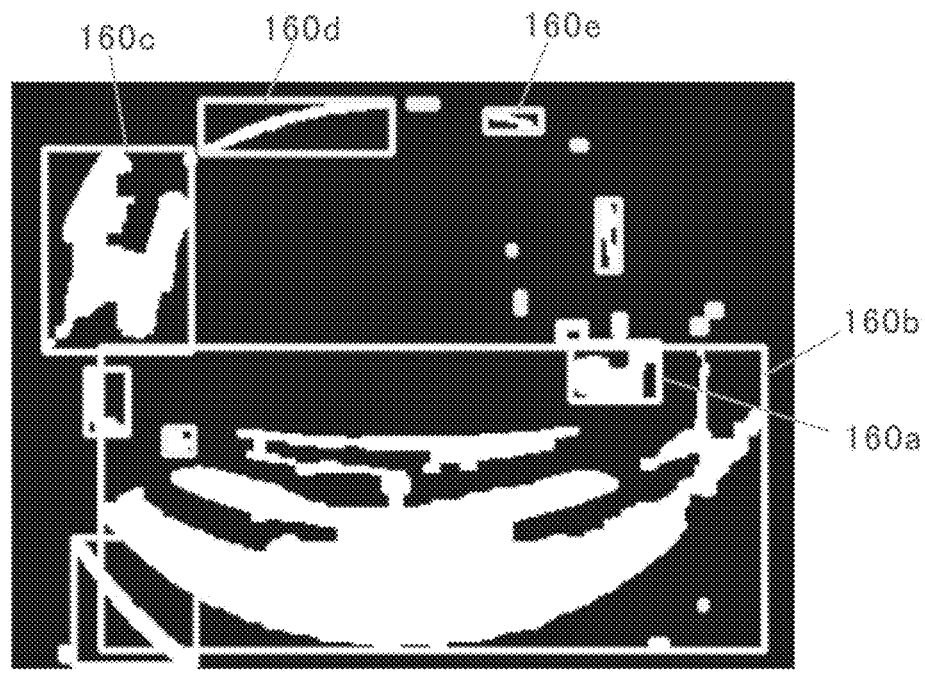
FIGS. 18A to 18C are image examples illustrating filtering processing in which the horizon line is used.
Figure 18B:
Figure 18C:
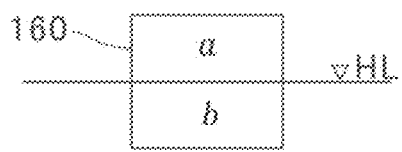

FIGS. 18A to 18C are image examples illustrating filtering processing using a horizon line. FIG. 18A shows a binarized image and detection boxes (on which processing up to grouping and separation has been performed). FIG. 18B shows a detection box subjected to filtering processing and a gray scale image of the current frame on which the detection box is superimposed.

As seen from the comparison of FIG. 18A with FIG. 18B, in an image sequence captured by a vehicle-mounted camera or the like while the camera is moving, there is the possibility that a road sign and a pedestrian crosswalk (a detection box 160*b* of the pedestrian crosswalk) in a lower portion of the image, and buildings, advertising signs, a traffic light, electric wires, a street light, and the like (a detection box 160*c* of the advertising sign, a detection box 160*d* of the electric wire, and a detection box 160*e* of the street light) in an upper portion of the image will be detected as moving objects. However, a moving object desired to be detected in the present invention is an object that moves on the ground such as a pedestrian or an automobile (a detection box 160*a* of the automobile).

In view of this, as a determination expression shown in FIG. 18C, areas a and b separated by the horizon line HL are obtained for all of the detection boxes 160, and detection boxes that do not overlap the horizon line HL by a predetermined ratio are removed. In this embodiment, detection boxes for which the determination expression: $|a-b|/(a+b) \leq 0.6$ is true are kept (Correct=1), and the other detection boxes are removed (Correct=0).

As a specific example of the determination expression, since a=b when the horizon line HL passes through the center of a detection box, the value of the determination expression is 0, Correct=1, and the detection box 160 remains. When the horizon line HL does not overlap a detection box, the value of the determination expression is 1, Correct=0, and the detection box 160 is removed.

Note that, the threshold value is set to 0.6 as an example, and the numerical value of threshold value may be determined as appropriate. For example, the threshold value may also be set to $|a-b|/(a+b)<1$. In this case, only a detection box that the horizon line HL does not overlap at all is removed.

In this manner, it is possible to remove a detection box 160 that is not a detection box of a moving object, through appropriate and high-speed processing. Accordingly, it is possible to increase the accuracy of detection of a moving object desired to be detected in order to avoid a danger.

Various techniques for detecting a horizon line are conceivable, but, in this embodiment, a genetic algorithm is used for detecting a horizon line. Since the genetic algorithm solves optimization problems and searching problem by mimicking the principles of biological evolution. the biological evolution process which included mutation, crossover, and selection improve the chances of finding a global solution, and thus the genetic algorithm is the most preferred method. Accordingly, it is possible to accurately detect a horizon line that is difficult to recognize easily, being hindered by the shapes of a building and road.

Figure 19:
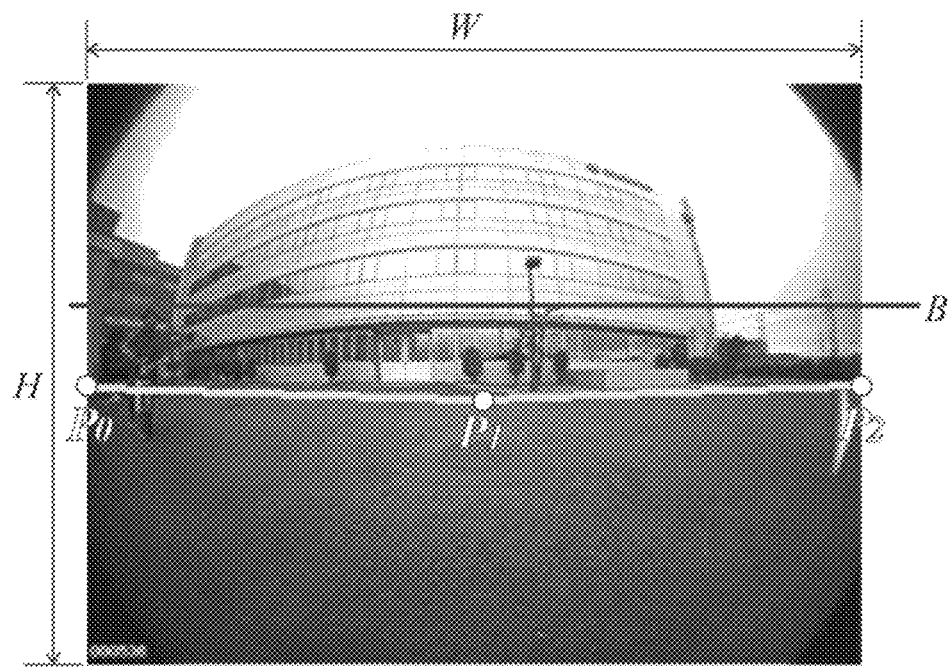
FIG. 19 is a diagram illustrating conditions and the like of a genetic algorithm.

FIG. 19 is a diagram illustrating conditions and the like of the genetic algorithm. To briefly describe detection of a horizon line to be describe below, the boundary line between a road surface and another object (a structure such as a building, the sky, or the like) is detected using the genetic algorithm, and is defined as a horizon line. Pi (xi,yi) indicates an i-th pixel (point) on the horizon line. xi is an x coordinate of the i-th point on the horizon line. yi is a y coordinate of the i-th point on the horizon line, and is represented as the height of a base line B+variable a+variable bi. Also, a, b0, b1, . . . bM are defined as chromosomes of the genetic algorithm.

FIG. 20 is a flowchart of the genetic algorithm. The filter unit 126 first initializes the algorithm using predetermined initial values (step S250). The initial values of the algorithm may be set as the number of generations (50), the number of initial individuals (50), the crossover rate (0.7), and the mutation rate (0.01), as an example.

Next, temporary parameters are assigned to initial individuals, and a candidate line for the horizon line is generated (step S252). While repeating crossover and mutation based on the logic of the genetic algorithm, the degree of a matching to an objective function of the candidate line is evaluated (step S254). Note that crossover and mutation in the genetic algorithm are regarded as a known technique, and thus a detailed description thereof is omitted here.

FIG. 21 is a diagram illustrating the objective function of the genetic algorithm. An objective function F represents the number of pixels DiffTB (j, x) whose difference in pixel values exceeds a threshold value. j indicates an evaluation width, and an evaluation range L is the maximum value of j. x indicates an x coordinate of an intermediate position between the pixel Pi (xi,yi) and a pixel Pi+1 (xi+1,yi+1). Y(x) indicates an x function representing the y coordinate of a pixel P through linear interpolation (simple equation).

The pixel value (grayscale value) of the i-th pixel Pi (xi,yi) is expressed as P (xi,yi). Regarding determination of the pixels DiffTB (j, x) whose pixel values are different, 1 is set if the difference in pixel value $|P(x, Y(x)+j)-P(x, Y(x)-j)|$ is larger than or equal to a threshold value, and 0 is set if it is smaller than the threshold value. DiffTB (j,x) is 1 if the pixel values (grayscale value) are different by a threshold value or larger as a result of comparing pixel values at positions separated in the y-axis direction by 2j. Therefore, the value of the objective function F is larger as the horizon line formed by the chromosomes a, b0, b1, . . . bM lies closer to the boundary line between the road surface and another object. In other words, detection of the horizon line using this genetic algorithm is extraction of a contour of the upper edge of the road surface.

In addition, DiffTN and DiffBN in the evaluation function F are respectively decided as results of comparing pixel values of pixels P(x, Y(x)−j) and P(x, Y(x)+j) and of ones adjacent thereto (next thereto). Accordingly, the value of the evaluation function F increases when there has a vertical line of the objects such as building, car, and others on the above part from the horizon line (horizontal line) by the DiffTN. On the contrary, if there is no change caused by vanishing of ground plane in the part below the horizontal line (horizontal line), the DiffBN is increasing the value of evaluation function F. The value is higher at the intersection between the horizontal line and the vertical line, in other words, the value is higher at the intersection between the building and the ground. Accordingly, it is possible to improve the accuracy of detection of the horizon line.

When calculation of a predetermined number of generations ends, the filter unit 126 outputs a selected candidate line as the horizon line (step S256). The horizon line that has been output is used for the determination expression described with reference to FIG. 18C.

The filter unit 126 then determines whether or not there is a next frame (step S258), and if there is a next frame, repeats horizon line detection using the genetic algorithm, and if there is no next frame, ends processing for detecting the horizon line.

Detection of a horizon line using the genetic algorithm can be performed on single image. In this case, the processing may be performed on all of the frames, but it is possible to increase the speed in a large amount by performing the processing on frames for every fixed time. In addition, by performing the processing for every fixed time while there is no change in the image, and performing the processing also when the image changes largely, it is possible to increase the speed of processing, and improve the accuracy.

In addition, if an acceleration sensor is installed, or if a signal of an acceleration sensor is received from a navigation system, the processing may also be performed when the camera turns a corner or the moving direction changes between upward and downward. Accordingly, it is easy to follow change in the horizon line, and the detection accuracy can be improved.

In addition, regarding detection of a horizon line using the genetic algorithm, it is possible to increase the speed and improve the accuracy by using a calculation result of the previous frame (the image of the previous frame is not used). Specifically, calculation is performed using chromosome information of all of the individuals of the genetic algorithm that includes the optimum solution calculated in the previous frame, as initial chromosomes of a population of initial individuals (evolutionary video processing). In particular, when performing the processing on all of the frames, or when performing the processing on frames that are set at short time intervals, movement of the horizon line in the image is small, and thus, if the calculation result of the previous frame is used, conversion to the optimum solution takes an extremely short time. Therefore, even a CPU of a vehicle-mounted computer can perform calculation at a speed sufficient for real-time processing, and it is possible to continuously detect the horizon line.

As described above, by removing detection boxes that do not overlap the horizon line by a predetermined ratio, it is possible to increase the accuracy of detection of a moving object. In addition, by using the genetic algorithm for detection of a horizon line, it is possible to accurately detect the horizon line.

The present invention can be used as a moving object detection apparatus and moving object detection method that are inexpensive and safe, and can accurately detect a moving object from an image sequence captured by a monocular camera at a high speed.

The invention claimed is:

1. A moving object detection apparatus comprising:
   an input unit for inputting an image sequence;
   a frame acquisition unit that continuously extracts a plurality of frame images from an image sequence;
   a horizon line detection unit that detects a horizon line in a frame image;
   an edge image generation unit that generates an edge image from a frame image; and
   a moving object detection unit that sets a detection box on a moving object,
   wherein the edge image generation unit extracts an edge image below the horizon line detected by the horizon line detection unit, and
   extracts a difference between the edge image below the horizon line and a background image of the edge image using a background subtraction method, and
   the moving object detection unit converts a frame image into a gray scale image and extracts a difference between the gray scale image and a background image of the gray scale image using the background subtraction method, and
   generates a foreground by combining the difference between the edge image below the horizon line and the background image of the edge image with the difference between the gray scale image and the background image of the gray scale image.

2. The moving object detection apparatus according to claim 1,
   wherein the moving object detection unit combines the difference between the edge image below the horizon line and the background image of the edge image with the difference between the gray scale image and the background image of the gray scale image if the difference between the edge image below the horizon line and the background image of the edge image contains only little noise.

3. The moving object detection apparatus according to claim 2,
   wherein the edge image generation unit extracts an edge image that is connected to the horizon line detected by the horizon line detection unit, and
   the moving object detection unit filters the foreground using the edge image that is connected to the horizon line.

4. The moving object detection apparatus according to claim 3,
   wherein, when the moving object detection apparatus is moving, the moving object detection unit filters the foreground using the edge image that is connected to the horizon line.

5. The moving object detection apparatus according to claim 1,
   wherein the edge image generation unit extracts an edge image that is connected to the horizon line detected by the horizon line detection unit, and
   the moving object detection unit filters the foreground using the edge image that is connected to the horizon line.

6. The moving object detection apparatus according to claim 5,
   wherein, when the moving object detection apparatus is moving, the moving object detection unit filters the foreground using the edge image that is connected to the horizon line.

7. A moving object detection method comprising:
   a step of inputting an image sequence;
   a step of continuously extracting a plurality of frame images from an image sequence;
   a step of extracting an edge image below a horizon line from a frame image;
   a step of extracting a difference between the edge image below the horizon line and a background image of the edge image using a background subtraction method;
   a step of converting a frame image into a gray scale image and extracting a difference between the gray scale image and a background image of the gray scale image using the background subtraction method; and
   a step of generating a foreground by combining the difference between the edge image below the horizon line and the background image of the edge image with the difference between the gray scale image and the background image of the gray scale image.

* * * * *